United States Patent [19]

Weber

[11] 4,304,991
[45] Dec. 8, 1981

[54] INDICIA SENSOR APPARATUS

[76] Inventor: Harold J. Weber, 20 Whitney Dr., Sherborn, Mass. 01770

[21] Appl. No.: 79,075

[22] Filed: Sep. 26, 1979

[51] Int. Cl.³ .................. G06K 7/06; G06K 21/00; G08C 9/00; H01H 43/08
[52] U.S. Cl. .................................. 235/442; 200/46; 235/489; 235/443; 340/365 A
[58] Field of Search ............... 235/441, 442, 443, 486, 235/489, 447; 200/46, 86; 340/149 A, 347 P, 365 A; 35/48 B

[56] References Cited

U.S. PATENT DOCUMENTS

| | | | |
|---|---|---|---|
| 3,200,240 | 8/1965 | Hammel | 235/443 |
| 3,515,339 | 6/1970 | McEwan | 235/447 |
| 3,525,855 | 8/1970 | Azuma | 235/442 |
| 3,617,666 | 11/1971 | Brave | 340/365 A |
| 3,624,619 | 11/1971 | Ambrosio | 340/347 P |

Primary Examiner—Robert M. Kilgore

[57] ABSTRACT

Indicia sensor apparatus which provides for a ready, low cost, electrical sensing of an indicia, supported on a readily interchangeable membrane, and provided as a coded pattern of aperture through the membrane. An elastomer electrode element, such as a conductive foam rubber, is pressed against the face of the membrane with sufficient pressure so as to induce a protuberance of some part of the relatively adaptive elastomer through each membrane aperture. This protuberance brings about contactual intercourse with a correspondent receptor electrode for each aperture position. The result is an electrical circuit change which may be utilized in a current seeking path to produce different binary logic values in accord with the coded aperture pattern carried by the membrane.

14 Claims, 11 Drawing Figures

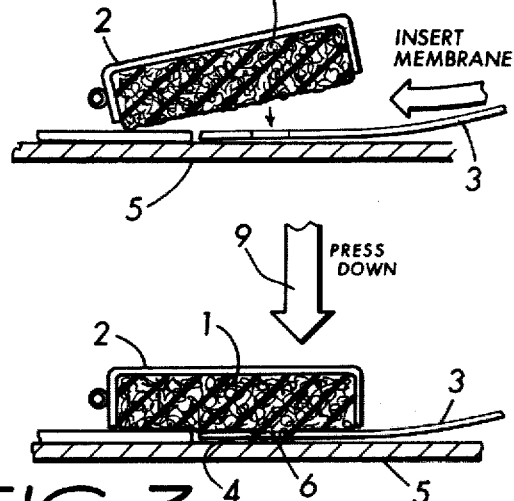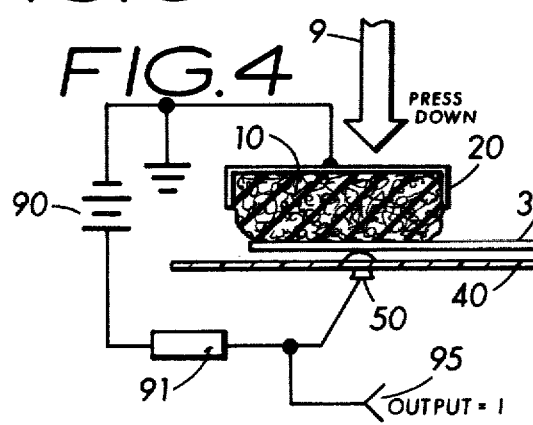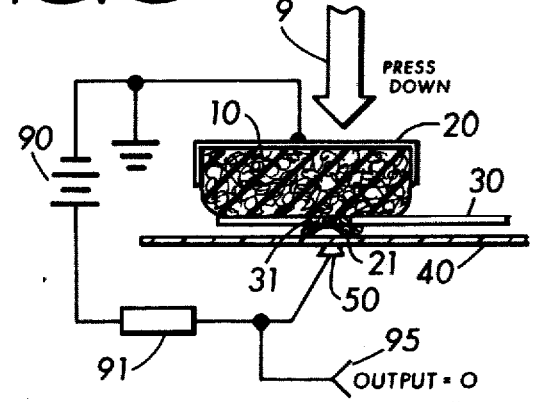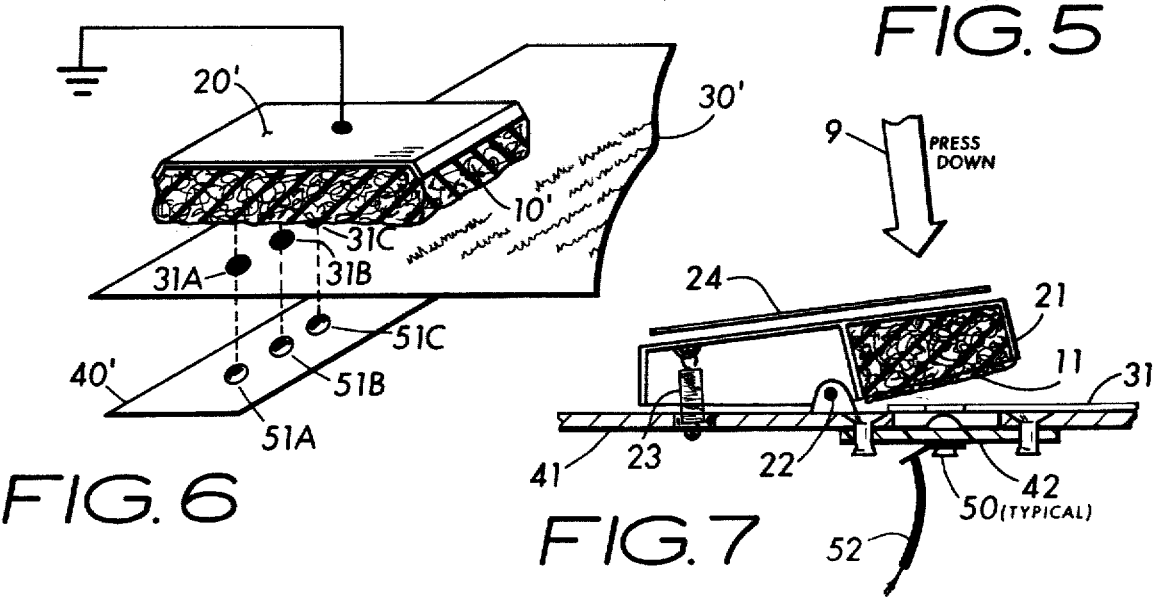

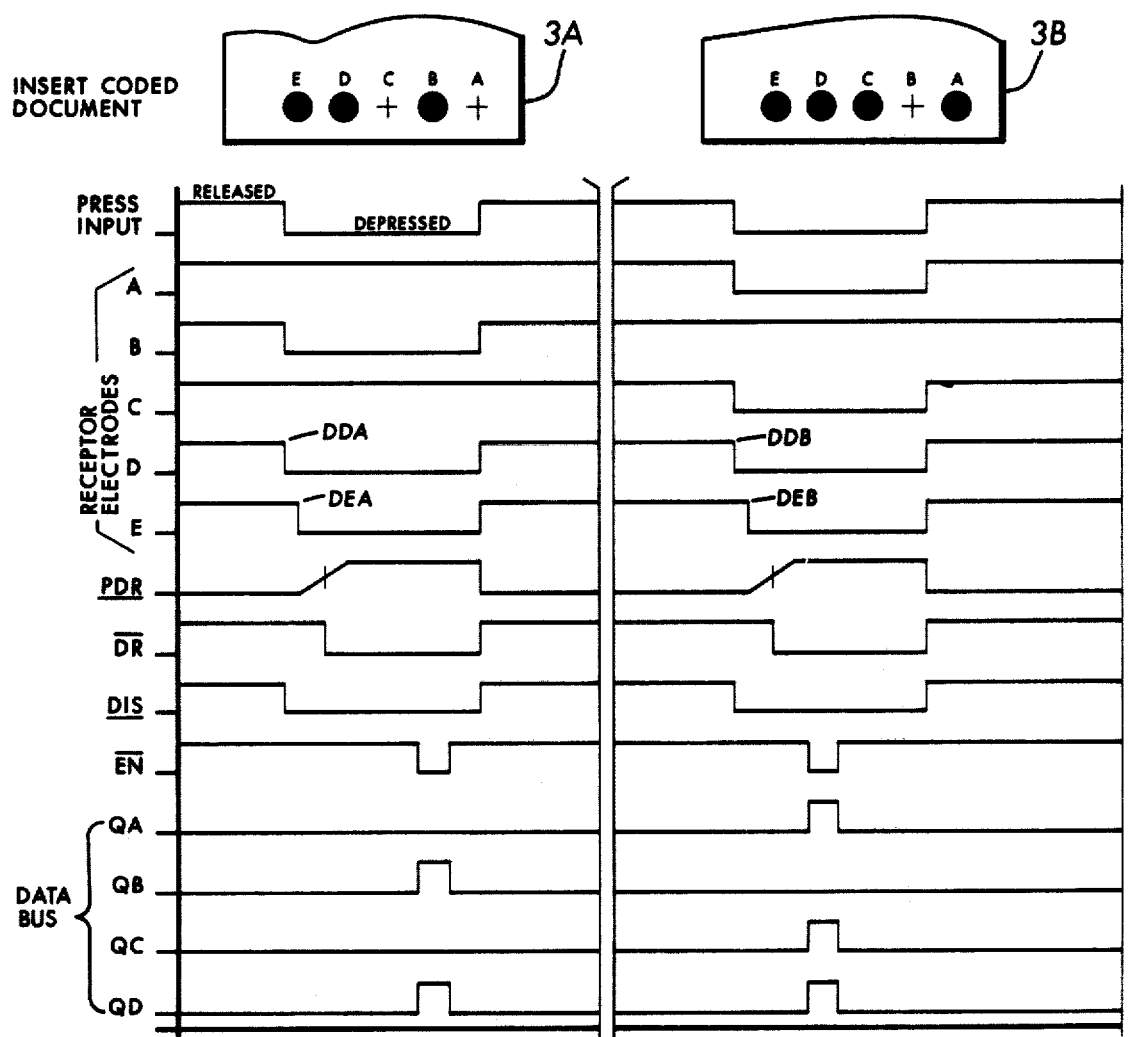
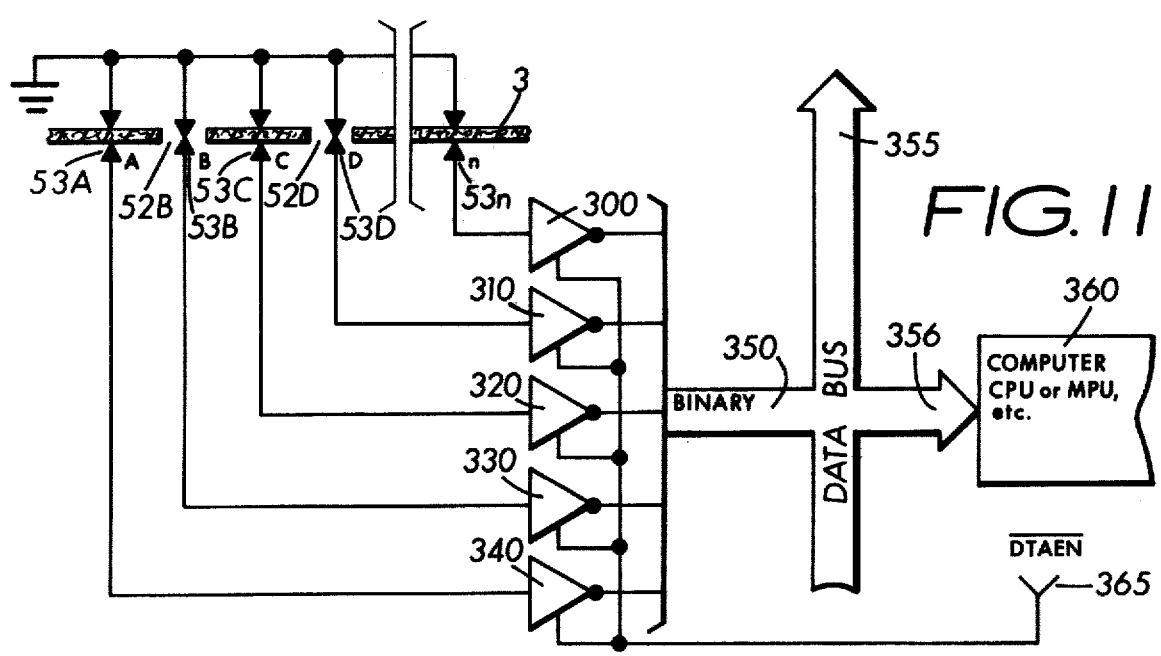

INDICIA SENSOR APPARATUS

SUMMARY

The gist of the invention is an indicia sensor effective as the receiver of a varied combination of coded apertures arranged through the substance of each of a plurality of purposefully interchangeable membranes. In the usual embodiment, the apertures are coded to support the questions or the like on an educational test sheet, for control data input to a computer, or like application. The membrane is usually paper, cardboard, or thin plastic and is a good electrical insulator. The membrane is addressed from the first surface by an electrically conductive compliant elastomer electrode, such as conductive foam rubber. Such sufficient pressure is applied to the elastomer electrode as to cause it to effect a protuberance through each available aperture in the coactive membrane. An arrangement of receptor electrodes, usually oriented as an array of contacts, is provided in immediate proximate relationship with the second surface of the membrane element so as to at least nearly coincide with each possible aperture position. The protuberant extension of the elastomer will, when an aperture allows, extend so as to produce effective electrical intercourse with the receptor electrode. Therefore, when such a contact is accomplished a binary level value will be provided which is complementary to the value produced when the membrane surface is continuative and no electrical contact is provided. The produced electrical signal value changes are adapted, by a translator circuit, into a binary code format having a wieght suited for coaction with a computer data bus or other such functional apparatus.

In an earlier U.S. Pat. No. 3,200,240 "Perforated Record Member Sensing Apparatus", Hammel describes an elastomer electrode having a pattern of preformed protrusions which were oriented to align with any number of corresponding apertures in a business machine card. Therefore the apertures and the protrusions had to exactly align. The protrusions were subject to wear due to their relatively small size with comparison to the overall electrode. The manufacture of the resilent electrode was a costly molding operation, not a simple slicing operation as herein proposed. Therefore what this invention clearly teaches now is an accomodating membrane aperture sensor which utilizes a relatively flat surfaced elastomer electrode which will, when brought into compressive contact with an aperture bearing insulative membrane, form an instant protuberance of the electrode constituent through the aperture and into intimate electric contact with a correspondent, usually flat mating electrode. The variability of the position for the establishment of the instant protuberance allows considerable latitude in the position and angular skew of the membrane relative to the sensor apparatus. The relatively flat elastomer electrode surface provides distribution of the wear forces which may normally occur, thereby markedly extending the electrode life. Still further improvement is wrought by instructing the delayed completion of one aperture controlled electric contact, thereby enabling solid contact between all of the significant aperture controlled contacts before a valid reading of the plural contact status is recognized.

DESCRIPTION OF DRAWINGS

Four sheets of drawings, including eleven figures, serve to illustrate the invention, as:

FIG. 2—A hinged receptor station is shown, with insertion of interchangeable membrane depicted.

FIG. 3—Receptor station pressed into place so as to produce protuberant extension of the elastomer electrode through an aperture.

FIG. 4—Insulating effect of contiguous membrane is shown.

FIG. 5—Protuberant intercourse between elastomer electrode and receptor electrode, as allowed by membrane aperture, is depicted.

FIG. 6—Isometric view of a skeletal sensor station giving relationship between elements.

FIG. 7—View of a preferred sensor station embodiment having a "press to read" action, as suited for the rapid manual reading of a large number of documents.

FIG. 8—The sensor station of FIG. 7 is shown in a product adapted to read indicia on the corner of a document, for example the answer to a test question contained on the document, such as a "flash card".

FIG. 10—Waveform depictions for circuit of FIG. 9.

FIG. 11—The strobed interface of the sensor station data states into a computer DATA BUS is shown.

DESCRIPTION OF PREFERRED EMBODIMENT

Figure 1:
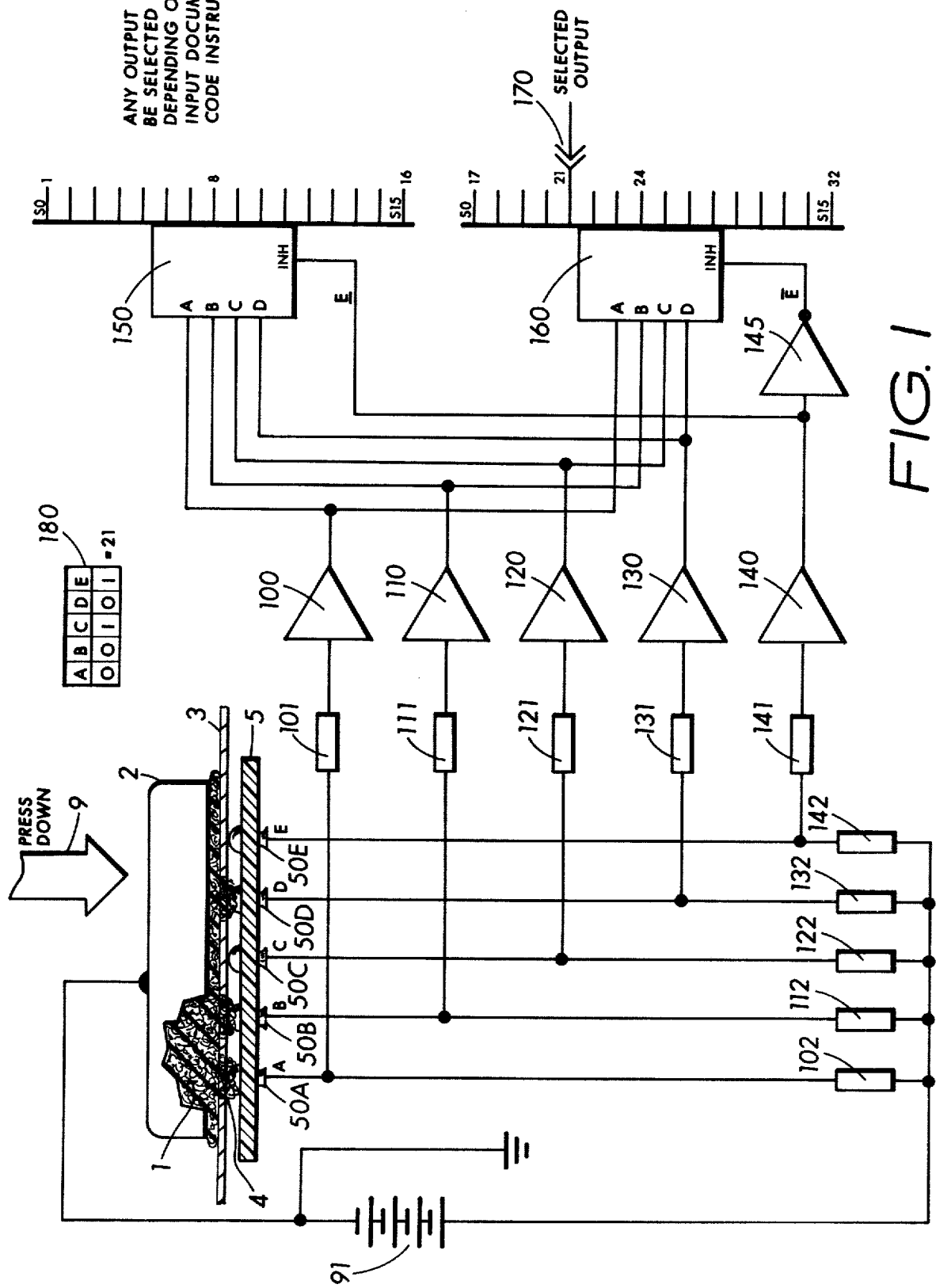
FIG. 1—The sensor station is shown having an elastomer in contact with a membrane having three apertures over an array of five receptor electrodes, thereby yielding a selection of at least one of thirty two output lines.

The essence of my invention can be deduced from FIG. 1. An adaptive elastomer electrode 1 is shown in a containment 2 which serves to support the elastomer electrode element in a compressive contact with the first surface of an indicia bearing membrane 3, such compression being brought about usually by an externally applied pressure 9 such as provided by an operator's finger pressure, a spring, or the like.

The elastomer 1 is a conductive foam rubber. Such substance is well known, is suitably adaptive under compression, and supports an intrinsic resistance which is commonly less than a few thousand ohms. The membrane 3 is usually a document of some sort, such as a test sheet, a tutoring "flash card", or other such device wherein the substrate material is ordinary paper, light cardboard, plastic, or other substance suited for the application at hand. The membrane has one or more apertures 4 which are arranged in a significative way, e.g. as an indicia, usually corresponding to a binary code format. The protuberant extension of the elastomer electrode through the membrane aperture is an essential part of the invention which results in electrical contact with at least one of several receptor electrodes 50A, 50B, 50D in the illustrated example. Meanwhile receptor electrodes 50C, 50E are masked from direct contact with the elastomer electrode by the contiguous membrane extension brought about where no apertures appear. In the shown example, the code 180 which is (00101)=21 is decoded by the two shown 4:16 line decoders 150, 160. It is to be understood that in 1-2-4-8 binary code (00101)=20, except in the sense when using the decoders in a hookup where binary (00000)=1 as in this case. A d.c. source 91 couples with the negative side to ground and the elastomer electrode 1 by way of the confinement means 2, which is also preferably conductive. Should the confinement means be insulative, such as plastic, then connection to the elastomer electrode may be accomplished with a flexible wire in contact with some part of the elastomer electrode. The receptor electrodes 50A, etc. are rivets, eyelets, or the like supported on an insulative substrate 5, such as phenolic. Alternatively, the receptor electrodes may be copper regions etched onto a printed circuit board, in well known practice of that particular art. The d.c. electric signal source 91 positive connection is completed to each receptor electrode by way of separate current source resistors 102, 112, 122, 132, 142. When the elastomer electrode is separated from the receptor electrode, as by the intervention of the membrane, the potential between the receptor electrode and ground will be about that of the d.c. source positive value. In the other instance, when a contact exists between the elastomer electrode and the receptor electrode, the potential on the receptor electrode will be near ground. The resultant receptor electrode values are each, in separate ways, coupled to buffer (amplifier) functions 100, 110, 120, 130, 140 by way of input protection resistors 101, 111, 121, 131, 141. The embodiments I describe use C-MOS logic, not as a limitation, but merely by way of example, and because the high input impedance characteristic of such logic is useful in simplifying the implementation of my embodiments. Therefore the buffer may be a CD-4050. The outputs of the several buffers comprise binary logic lines A, B, C, D, E. Lines A, B, C, D connect, in parallel, with corresponding inputs on the CD4515 type 4:16 line decoders 150, 160. The $\underline{E}$ line output from buffer 140 couples to the INH (inhibit) input on decoder 150 and to an inverter 145 which produces an $\bar{E}$ output coupled to the INH input on decoder 160. Therefore when logic $\underline{E}=0$, decoder 150 will function, whereas when $\underline{E}=1$ (and $\bar{E}=0$) decoder 160 will function. In the example shown, line "21" is decoded as the selected output 170.

The elastomer electrode 1 confinement 2 is shown in FIG. 2 to be hinged, and opened, to admit membrane 3 which is then clamped in intimate contact with the elastomer electrode as in FIG. 3 by a "press down" action 9. This results in a protuberance 6 of the elastomer electrode material through the aperture 4 into contact with the supporting substrate 5. The electrical intercourse is more clearly shown in FIG. 4 wherein a battery 90 and a current sourcing resistor 91 couple between the elastomer electrode 10 (by way of a conductive confinement 20) and the receptor electrode 50, supported on substrate 40. The membrane 30 inhibits contact between the conductive elastomer and the receptor electrode, thereby giving rise to full battery potential on the receptor electrode and the corresponding output 95 producing a logic (1) level. The inclusion of an aperture 31, as in FIG. 5 allows a protuberance of foam elastomer 21 to come in contact with the receptor electrode 50, effectively "shorting" the electrode to ground by way of the conductive elastomer, resulting in a logic (0) at the output 95.

Yet another view of a typical embodiment appears in FIG. 6 where a conductive confinement 20' couples the elastomer 10' to ground. The relationship between the face of the elastomer electrode 10' and the first surface, e.g. top side, of the indicia bearing membrane 30' is clearly shown. Also shown is the relative, albeit separated, relationship between the receptor electrodes 51A, 51B, 51C on substrate 40' positioned behind the second surface of the membrane 30'. The broken lines indicate the correspondent contactual relationship between parts.

More detail of a "press down to read" data entry means is shown in FIG. 7. A hinged 22 containment vehicle 21 supports the conductive elastomer 11 over the face, or first surface, of membrane 31. A "press down" action 9 tilts the containment so as to bring the elastomer electrode into intimate contact with membrane 31 first surface and thereby allow the extension of the elastomer through any aperture into intimate contact with the receptor electrode 50 supported on substrate 42. When the pressure is released, spring 23 recovers the containment to its original open position, as stopped by supporting framework 41. Electrical connection is between lead 52 and the conductive containment. Plate 24 serves as a decorative overlay, such as wood-grain plastic laminate.

The form for a preferred embodiment application for my invention appears in FIG. 8. A station 2, including the elastomer element and receptor electrodes, is provided which is similiar to that described for FIG. 7. The document 3 is a test sheet, for example a school quiz, wherein the indicia elements 4A, 4B, 4C are denotative of the response desired, or some other important parameter, which is relevant to the interrogative quality of the test sheet document 3. The document functions as the membrane relationship between the station 2 elements, thereby providing an essential interaction.

Figure 9:
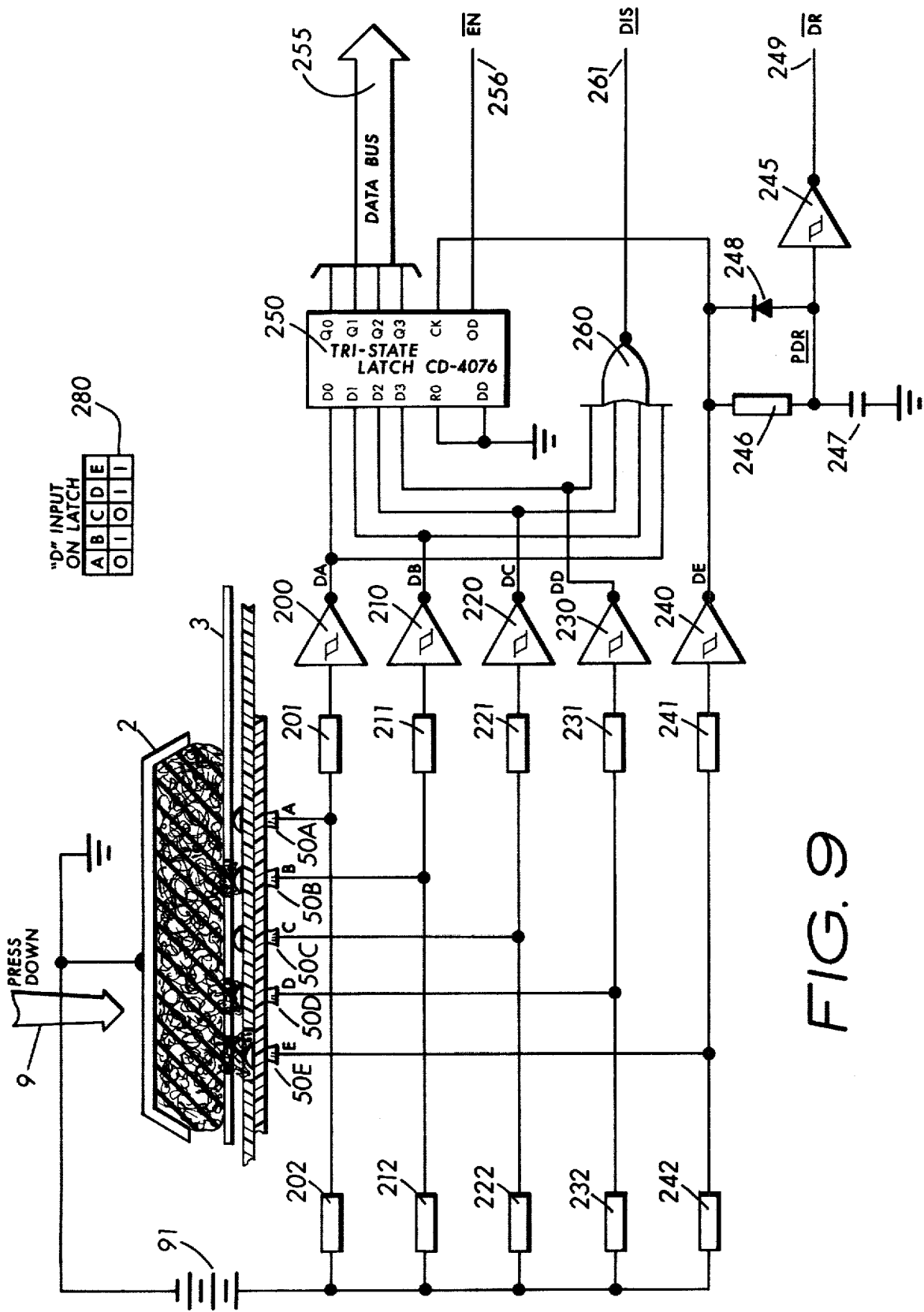
FIG. 9—The sensor station is depicted with one delayed-entry receptor electrode to provide a "data ready" function, together with a memory latch to hold data after a change in input conditions.

A variant embodiment for my invention occurs in FIG. 9. The receptor electrodes 50A through 50E, through interaction with pull-up resistors 202, 212, 222, 232, 242 and input protection resistors 201, 211, 221, 231, 241, coact with Schmidt-action inverters 200, 210, 220, 230, 240 to provide positive signal processing. The important teaching is the receptor electrode relationships relative to any elastomer electrode protuberance through an indicia aperture. The FIG. 9 clearly shows receptor electrode 50E to be set lower, e.g. more distant from the elastomer electrode, than what the other receptor electrodes are. Therefore when the arrangement, including the elastomer electrode, is "pressed down" 9, contact to receptor electrode 50E will invariably occur slightly after the other contactual relationships are set-up, and conversely, will be released just before the other contacts open. This "delayed make/early break" action produces a DE signal from Schmidt inverter 240 which couples to the CK (clock) input of the tri-state latch 250 (CD4076) to enable entry, on a positive pulse edge on line DE, which will transfer the input data lines DA, DB, DC, DD to the data bus 255 which may serve to operate an external computer, or other data responsive means. The DE line also couples to another Schmidt inverter 245 by way of an integrator comprising resistor 246, capacitor 247, and recovery diode 248. The purpose is to effect a retarded $\underline{PDR}$ signal at the input of inverter 245, which results in a $\overline{DR}$ (data ready) flag signal 249 which is slightly delayed so as to assure latch clock transfer action. This may be used to synchronize data entry into an ancilliary control system means, such as a computer. A $\underline{DIS}$ (disable) signal is produced by NOR gate 260. When any one (or more) lines DA, DB, DC, DD have a (1) logic level present, as produced by an aperture-allowed signal, the $\underline{DIS}$ line 261 will be driven to a low logic level (0). An $\overline{EN}$ (enable) signal input 256 from an external control is also shown.

Waveform representations in FIG. 10 serve to explain the signal events occurring in the circuit of FIG. 9. Initially, lines A, B, C, D are high. When an indicia bearing membrane 3A is inserted, and the "press input" 9 is "depressed", lines B, D, and E will drop low. At the same time, the low on line E results in a high (1) on DE which causes PDR, at the input of Schmidt inverter 245 (type MC14584, etc.) to rise as the capacitor 247 is charged through resistor 246. At the switch-over level for the Schmidt inverter 245, viz "positive trigger threshold voltage $V_p$", which occurs usually about 45% to 70% of the logic $V_{DD}$ value (i.e., the power supply voltage), DR will switch to a low state. Careful study of the waveforms also reveals that the D signal DDA changes value at a finite time prior to the switching of signal DEA, due to the retarded switch action purposefully built into the E line receptor electrode by submounting, etc. When ever any one of the lines A, B, C, D go high, line DIS is also shown to go to a low state by the action of gate 260. An enable signal EN (low state active) brought in from an external computer or other logic control unit will enable the DATA BUS outputs, resulting, in this exampled embodiment, in a high state on lines QB and QD, e.g. an output state (0101). The right-hand waveforms show the changes brought about when a different membrane 3B indicia is entered. Again the time-offset of the DDB and DEB lines are pointed out. Other waveforms operate as before, with allowance for the different code sequence.

Direct DATA BUS entry into a computer is shown in FIG. 11. In this embodiment, an indicia bearing membrane having any number of contactual means 53A, 53B, 53C, 53D . . . 53n operating through various apertures, such as 52B, 52D, etc. serve to enter logic HIGH or LOW states into TRI-STATE INVERTERS (type CD4502) 300, 310, 320, 330, 340 the outputs of which couple 350 to a binary DATA BUS 355 which may serve a computer 360. The inverters are strobed, e.g. read-out is accomplished, when the data entry DTAEN line 365 is driven LOW, as by the computer control lines, producing an entry 356 into the CPU, MPU, memory, etc. The indicia sensor apparatus may, therefore, be used for direct computer access in lieu of, or to supplement, other known entry means such as keyboard, etc.

While the invention is most describedly taught as a means for reading coded answers or the like on quiz, or test, sheets such as commonly used for educational purposes, this shall not limit the applications to other data entry requirements, such as inventory control systems, and other data programming requirements.

The essence of the invention is particularly taught to be the interchangeable membrane providing an indicia bearing aperture pattern through which a protuberance of the electrically conductive adaptive elastomer electrode is allowed, thereby uniting in contactual intercourse with the correspondent receptor electrode for the purpose of completing an electrical circuit in response to the presence of an aperture.

The taught embodiments give illustrative application for the essence of my invention. The embodiment of the essence in other form or application aside from these descriptions is, however, within the scope of my claimed invention, because such alternate application as may arise is merely an exercise of the skills of the art which is brought forth from the efforts of my novel teaching.

What I claim is:

1. Indicia sensor apparatus adapted in an electric circuit for the effective translation of an indicia form into electrical value signals, comprising in combination:
    a. a plurality of interchangeable membrane element means of substantially insulative composition, providing a first surface and a second surface and having an indicia thereon represented as a coded plurality of apertures between the said surfaces;
    b. an adaptive electrode element means, comprising an electrically conductive elastomer means having a substantially flat resilient contacting surface effectively free of any protrusion above the surface plane thereof, oriented in compressive juxtaposition relative to the said membrane element first surface whereby the said elastomer electrode element flat conducting surface will effectively conform with sufficient protuberant extension through any indicia apertures to intersect with the plane of the second surface;
    c. a plurality of receptor electrode elements oriented on about the same plane as the said membrane element second surface, whereby each receptor electrode element is contactually correspondent with any one of the several possible adaptive electrode protuberances;
    d. a plurality of electric signal sources having a first terminal means effectively coupled to the said adaptive electrode element means, whilst a second terminal means is effectively coupled, in a separate way, to each of the plural said receptor electrode elements; and,
    e. a translator means having a plurality of electric signal responsive inputs, each coupled in an effectively separate way to each said electric signal source, and having an effectively plural output terminus which provides:
        ea. substantially separate first signal value for any said receptor electrode element which is in contactual correspondence with an adaptive electrode protuberance as usually produced by each aperture in the membrane element;
        eb. a substantially separate second signal value for any said receptor electrode element which is blocked contact with the adaptive electrode element, as usually produced by membrane element continuance.

2. Apparatus of claim 1 wherein the said membrane element is a sheet of paper or the like with a pattern of apertures situate thereon serving as an indicia.

3. Apparatus of claim 1 wherein the said adaptive electrode element may be retained in a relaxed first position relative to the said membrane, enabling the ready exchange of the said membrane for another having a different aperture arrangement after which the said adaptive electrode element may be reoriented into a compressive second position relative to the said membrane apertures, producing a protuberance therethrough.

4. Apparatus of claim 1 wherein the said membrane is an interrogative device, such as a test paper, with the coded apertures contained as some part thereof with a substantially binary code value format which is effectively correspondent to the requisite test response.

5. Apparatus of claim 1 wherein the adaptive electrode element is comprised of a conductive foam rubber compound.

6. Apparatus of claim 1 wherein the said receptor electrode elements are oriented as an array in a field relationship relative to the said membrane second surface so as to coincide with any usual aperture orientation which may be produced on the said membrane in accord with a prescript aperture code pattern.

7. Apparatus of claim 1 wherein contactual correspondence between any particular receptor electrode means and the adaptive electrode protuberance will effect a minimum voltage condition across the combination.

8. Apparatus of claim 1 wherein the adaptive electrode element is substantially confined in a moveable, usually hinged, containment means usually providing one side thereof which is substantially discontinuous and thereby gives allowance for the protrusion of some part of the adaptive electrode element, further being in near contact with the said membrane supported indicia so as to yield a compressive relationship between the protrusive adaptive electrode element and the membrane element.

9. Apparatus of claim 8 wherein the said moveable containment means may be positionally deflected by finger pressure exerted by an operator.

10. Apparatus of claim 1 further having an electrical latch means coupled to each said translator means output terminus and operative therewith to retain the electrical signal values for a finite period of time.

11. Apparatus of claim 1 wherein the said translator means said output terminus couples with a binary data bus adapted for interconnection with a computer means or the like.

12. Apparatus of claim 1 wherein at least one delayed entry receptor electrode, in contactual intercourse with at least one usually protuberant adaptive electrode means, serves to produce a DATA READY, DATA ENTRY, or equivalent entry control signal for the control of subsequent machine functions.

13. Apparatus of claim 1 wherein the said translator means said output terminus couples effectively with a binary decoder providing for the effective selection of at least one of a plurality of output signal lines.

14. Apparatus of claim 1 wherein the said translator means effectively functions so as to differentiate between:
  a. the first state of higher impedance electric signal value brought about between the receptor electrode means and the adaptive electrode means by the barrier effect produced by a continuous intervening membrane element means; and,
  b. the second state of lower impedance electric signal value brought about between the receptor electrode means and the adaptive electrode means by the contactual effect produced by an aperture, giving allowance for elastomer protuberance, in the otherwise continuous intervening membrane element means.

* * * * *